(12) United States Patent
Prohaska

(10) Patent No.: US 11,233,591 B1
(45) Date of Patent: Jan. 25, 2022

(54) VEGETATION GROWTH DETECTION VIA RADIO PROPAGATION

(71) Applicant: FPL Smart Services, LLC, Juno Beach, FL (US)

(72) Inventor: Mark J. Prohaska, Palm City, FL (US)

(73) Assignee: FPL Smart Services, LLC, Juno Beach, FL (US)

( * ) Notice: Subject to any disclaimer, the term of this patent is extended or adjusted under 35 U.S.C. 154(b) by 0 days.

(21) Appl. No.: 16/997,098

(22) Filed: Aug. 19, 2020

(51) Int. Cl.
*H04B 17/318* (2015.01)
*H04W 24/04* (2009.01)

(52) U.S. Cl.
CPC .......... *H04B 17/318* (2015.01); *H04W 24/04* (2013.01)

(58) Field of Classification Search
CPC .............................. H04B 17/318; H04W 24/04
See application file for complete search history.

(56) References Cited

U.S. PATENT DOCUMENTS

| | | |
|---|---|---|
| 4,904,996 A | 2/1990 | Fernandes |
| 5,150,038 A | 9/1992 | Kanemaru et al. |
| 5,223,817 A | 6/1993 | Hoyle |
| 5,337,353 A | 8/1994 | Boie et al. |
| 7,013,235 B2 | 3/2006 | Hyyppa et al. |
| 8,194,916 B2 | 6/2012 | Ma |
| 8,352,410 B2 | 1/2013 | Rousselle et al. |
| 8,354,850 B2 | 1/2013 | Soerensen et al. |
| 8,493,184 B2 | 7/2013 | Theeuwes |
| 8,618,934 B2 | 12/2013 | Belov et al. |
| 8,624,751 B2 | 1/2014 | Xie et al. |
| 8,631,696 B2 | 1/2014 | Wicht et al. |
| 8,666,553 B2 | 3/2014 | Phillips et al. |

(Continued)

FOREIGN PATENT DOCUMENTS

| | | |
|---|---|---|
| WO | 2013157920 A1 | 10/2013 |
| WO | 2017136884 A1 | 8/2017 |

OTHER PUBLICATIONS

Rankine et al, Seasonal Wireless Sensor Network Link Performance in Boreal Forest Phenology Monitoring, 2014 Eleventh Annual IEEE International Conferences on Sensing , Communication, and Networking (SECON), pp. 302-310 (Year: 2014).*

(Continued)

*Primary Examiner* — Lewis G West
(74) *Attorney, Agent, or Firm* — Fleit Intellectual Property Law; Jeffrey N. Giunta

(57) ABSTRACT

A method and method to detect vegetation growth into a wireless signal path. Signal strength indicators for a signal that is transmitted from a transmitter at a second location are received from a receiver at a first location. The signal strength indicators are determined to be consistent with a progression of a decrease in received signal strength corresponding to a growth of vegetation growing into a wireless signal path between the first location and the second location. A recent signal strength indicator is determined to be below a threshold from a baseline received signal strength, and a notification of likely vegetation encroachment into the wireless signal path is provided based on the recent signal strength indicator being below the threshold and determining that the signal strength indicators are consistent with a progression of a decrease in signal strength corresponding to a growth of vegetation.

20 Claims, 6 Drawing Sheets

(56) References Cited

U.S. PATENT DOCUMENTS

| | | | |
|---|---|---|---|
| 8,680,994 | B2 | 3/2014 | Leppanen et al. |
| 8,738,318 | B2 | 5/2014 | Spillane |
| 9,048,639 | B2 | 6/2015 | Hyde et al. |
| 9,910,102 | B2 | 3/2018 | Stoupis et al. |
| 9,991,580 | B2 | 6/2018 | Henry et al. |
| 10,370,014 | B2 | 8/2019 | Matson et al. |
| 2018/0046910 | A1 | 2/2018 | Greene |
| 2018/0098137 | A1 | 4/2018 | Saha et al. |
| 2018/0173820 | A1* | 6/2018 | Dow ............... G16B 99/00 |
| 2018/0189564 | A1* | 7/2018 | Freitag ............ A01G 22/00 |
| 2019/0179009 | A1 | 6/2019 | Klein et al. |
| 2020/0082168 | A1* | 3/2020 | Fathi ............... B64C 39/024 |
| 2020/0092019 | A1* | 3/2020 | Wang ............... H04W 24/10 |

OTHER PUBLICATIONS

Ahmad: Vegetation encroachment monitoring for transmission lines right-of-ways: A survey; sciencedirect.com. Electric Power Systems Research: vol. 95, Feb. 2013, pp. 339-352 2013.

Carvalho: Monitoring System for Vegetation EncroachmentDetection in Power Lines Based on Wireless SensorNetworks; researchgate.net. Department of Electrical Engineering, Federal University of Paraiba—UFPB. 41st International Conference on Telecommunications and Signal Processing (TSP) Aug. 2018.

Matikainen: Remote sensing methods for power line corridor surveys; sciencedirect.com. ISPRS Journal of Photogrammetry and Remote Sensing. vol. 119, Sep. 2016, pp. 10-31.

Kurinsky: Identification and Visualization of Vegetation Encroachment along Power Line Corridors using LiDAR; arcjournals.org. International Journal of Research in Geography (IJRG) vol. 1, Issue 1, Jun. 2015, pp. 38-51.

Rancea: Evaluation of Methods for Control of Vegetation in Utility Corridors; repository.usfca.edu. May 11, 2014. USF Scholarship: a digital repository.

\* cited by examiner

US 11,233,591 B1

VEGETATION GROWTH DETECTION VIA RADIO PROPAGATION

FIELD OF THE DISCLOSURE

The present disclosure generally relates to monitoring vegetation growth, and more particularly to monitoring vegetation growth based on observed attenuation in radio signal propagation.

BACKGROUND

Vegetative growth along power lines is a persistent issue facing power distribution systems. Power lines are often located near or over areas of growing trees or other vegetation. The power lines are susceptible to degraded operations or damage due to nearby trees or vegetation as well as trees or other vegetation that encroaches upon and may engulf a power line. Vegetation that is encroaching on a power line is able to cause line faults, such as arcing to the vegetation and thus to ground, that stress the system or cause protection devices to activate. Also, trees that are growing near to power lines may cause an increased risk of damage to the power lines and cause power outages due to incidents like falling branches.

Proactive monitoring of vegetation grown on or near power lines is often based on physical inspection of the power lines. Such inspections often involve sending personnel to visually inspect most or all of the entire distance of all of the power lines in a distribution network by either driving along the power line route or inspecting the power lines with a drone. The costs of such continual inspections are usually very high since they have to be performed at relatively frequent intervals based on the anticipated growth of vegetation in the area.

The utility poles that support power lines are able to be used to support other utility equipment. Radio communications equipment such as Fifth Generation (5G) cellular communications equipment are also being deployed by mounting transceivers and their associated antennas on utility poles that support power lines. Such transceivers may communicate with other devices over relatively short ranges. In some cases, these transceivers use small cell technology and millimeter wavelength to transport data and voice traffic. In some examples, such transceivers are mounted within line of sight of each other, in some cases as close as 100 to 200 feet from each other. In the example of transceivers that communicate with millimeter wave radio links, the millimeter wavelengths may be significantly attenuated by passing through vegetation.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
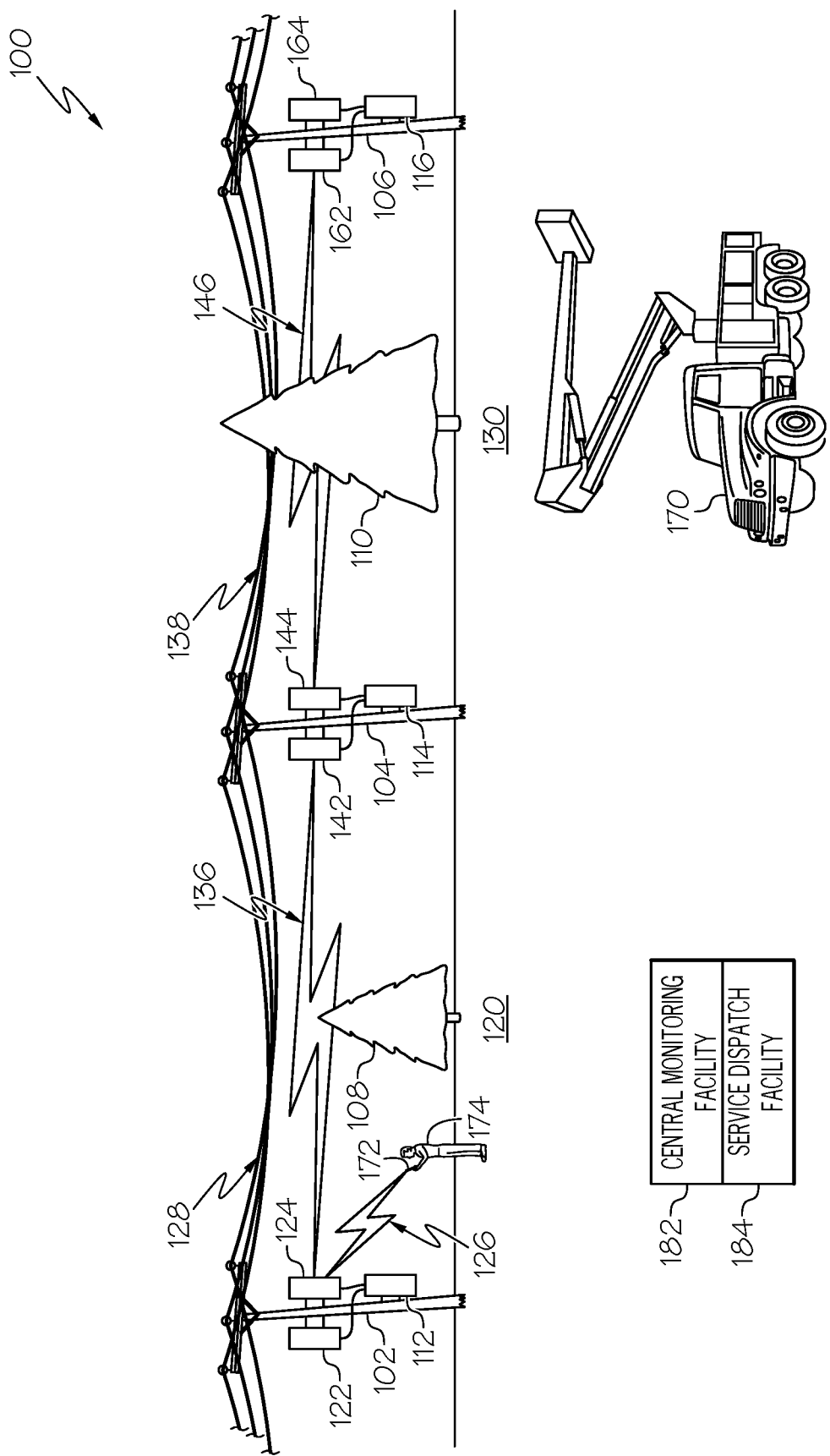
FIG. 1 illustrates an example aerial power line with vegetation growth, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods describe vegetation growth monitoring systems that operate to monitor vegetation growth and encroachment into infrastructure elements, such as power lines, based on monitoring attention of wireless signal propagation, such as RF signal propagation, along wireless signal paths near those infrastructure elements. In an example, cellular radio transceivers that operate over relatively short ranges are installed on fixed assets, such as poles supporting electrical distribution lines or transmission lines, poles supporting other infrastructure components such as public lighting devices, and the like. Such cellular radio transceivers are also able to be mounted on locations such as buildings, signs, traffic signal infrastructure, and the like. In an example, Fifth Generation (5G) cellular data transceivers that operate at very short wavelength frequencies, including millimeter wave frequencies, utilize radio waves that attenuate relatively rapidly with distance through vegetation. In an example, millimeter wave communications signals that are used by such 5G cellular data transceivers, or any other communications equipment, are well suited to detect the encroachment of vegetation into the propagation path of their signal and are thus able to be used in the below described systems and methods.

The transceivers mounted on various fixed assets are installed to communicate with various data terminals such as customer devices and the like. Many transceivers, however, are located close enough to at least one other nearby transceiver where a receiver in a given transceiver is able to receive a signal transmitted by another nearby transceiver. The transmissions by each transceiver in some examples uniquely identify each transceiver. Nearby transceivers that receive signals transmitted by a particular transceiver are therefore able to identify which transceiver transmitted the received signal.

In some examples, the geographic location of the antennas for each transceiver is stored in association with the transceiver. The geographic locations of the transceiver's antennas are compared to the locations of power lines to determine which pairs of transceivers are within Line-Of-Sight (LOS) of each other and which of those communicate over a wireless signal path that runs near aerial power lines.

In an example, the below described systems and methods operate by establishing a respective baseline signal strength measurement between transceivers that are within Line-Of-Sight of each other. In some examples, such baseline signal strength measurements are established for signals that are communicated between pairs transceivers that exchange wireless signals over wireless signal paths that run near aerial power lines. Such pairs of transceivers that communicate over wireless signal paths that run near aerial power lines are identified in an example based upon comparisons of the geographic locations of each transceiver, the Line-Of-Sight between each transceiver pair, and stored geographic locations of aerial power lines in the vicinity of those transceivers.

In an example, once a respective baseline signal strength measurement is established for each pair of transceivers that communicate over wireless signal paths that run near aerial power line, the signal strength of signals over each of those wireless signal paths is monitored for progressive decreases in strength that are consistent with vegetation growing into that wireless signal path. In an example, the monitoring of the measured signal strengths is able to include processing by an artificial intelligence, machine learning based algorithm to filter out anomalies and more accurately identify gradual signal losses that are consistent with vegetation growth.

In an example, the signal strength monitoring algorithm operates to filter out temporary anomalies caused by, for example, branches blocking signal due to wind, animals crawling into the wireless signal path, bucket trucks operating in the area of the wireless signal path, and the like. The processing includes a received signal strength monitoring algorithm that looks for a gradual decline in measured received signal strengths that indicate the steady growth of vegetation that is blocking the signal being communicated between two transceivers.

Once a certain loss threshold has been reached by the signal after progressively decreasing along a slow progression that is consistent with vegetation growth, a trouble ticket is created in an example to address the issue. This notification could also automatically cause the dispatch of vegetative crews to clear the lines or the airspace within the wireless signal path between the pair of transceivers whose signal is being processed. Additionally, in some examples, an informational notification is able to be triggered and sent to an operations center.

The below described automated monitoring of vegetation growth near aerial power lines by monitoring reductions in wireless signal strengths along wireless signal paths that run near aerial power lines reduces the amount of truck rolls and manual inspection truck rolls for vegetative crews that are needed to inspect the aerial power lines for blockages. Such reductions in truck roles advantageously reduces the amount of non-productive inspection truck rolls.

In some examples, the below described systems and methods are able to be used to monitor progressively signal strengths of a wireless signal that are transmitted between any pair of transceivers that are located at fixed locations that are close enough for Line-of-Sight communications. In general, the below described systems and methods are able to operate to monitor line of sight communications signals over extended periods of time in order to detect and identify the relatively slow and progressive decrease in received signal strength that consistent with vegetation grown encroaching into the wireless signal path between the two transceivers, including for wireless signal paths that are not near power lines. In some examples, the below systems and methods are used to automatically determine when vegetation trimming is needed to remove vegetation encroachment between transceivers, or between any transmitter and receiver pair, that is interfering with communications along that wireless signal path.

FIG. 1 illustrates an example aerial power line with vegetation growth 100, according to an example. The example aerial power line with vegetation growth 100 depicts three (3) power line support poles that support a portion of an aerial power line. The example aerial power line with vegetation growth 100 depicts a first power line support pole 102, a second power line support pole 104, and a third power line support pole 106. A first aerial power line portion 128 is suspended between the first power line support pole 102 and the second power line support pole 104. A second aerial power line portion 138 is suspended between the second power line support pole 104 and the third power line support pole 106. The present discussion refers to the depicted relatively short portion of an aerial power line in order to more concisely and clearly describe the relevant aspects of the depicted systems and methods.

Each power line support pole includes a wireless data transceiver and one or more antennas to support wireless data communications with various other wireless data transceivers. The depicted example shows one wireless data transceiver and two antennas mounted to each power line support pole. In various implementations, wireless data transceivers are able to be mounted on any subset of power line support poles and each wireless data transceiver is able to have any number of one or more antennas to support data communications.

A first wireless transceiver 112 is mounted on the first power line support pole 102 along with a left first antenna 122 and a right first antenna 124. A second wireless transceiver 114 is mounted on the second power line support pole 104 along with a left second antenna 142 and a right second antenna 144. A third wireless transceiver 116 is mounted on the third power line support pole 106 along with a left third antenna 162 and a right third antenna 164.

In order to more clearly describe the relevant aspects of these systems and methods, the example aerial power line with vegetation growth 100 depicts wireless data transceivers on adjacent power line supports poles being in wireless communications with one another. In general, the receiver in each of these transceivers is an example of a data receiver that is able to receive signals transmitted by several transmitters in transceivers that are located sufficiently near that transceiver for their signals to be received by that receiver. In some examples, each receiver measure received signal strength values for some or all of the signals that are received by that receiver from each nearby transmitter.

The example aerial power line with vegetation growth 100 shows a first user wireless signal path 126. The first user wireless signal path 126 carries a signal created by a transmitter in the first wireless transceiver 112 and transmitted by the right first antenna 124, which are mounted on the first power line support pole 102. In this illustrated example, the first user wireless signal path 126 supports data communications between the first wireless transceiver 112 and a user device 172, such as a smart phone or other data processing device, that is being used by a person 174. Due to the proximity of the first power line support pole 102 to the second power line support pole 104, the left second antenna 142 is also able to receive signals transmitted by the right first antenna 124 along the first wireless signal path 136 and provide that signal to the receiver of the second wireless transceiver 114. As is described in further detail below, in some examples each receiver in transceivers used to monitor vegetation growth measures received signal strength for each received signal that was transmitted from each nearby transceiver and sends those measurements along with an identification of the transmitter that transmitted that signal to a central monitoring facility for further processing.

The example aerial power line with vegetation growth 100 also shows the right second antenna 144 transmitting along a second wireless signal path 146 a signal that is generated by a transmitter in the second wireless transceiver 114. The signal carried along the second wireless signal path 146 is received by the left third antenna 162 and provided to a receiver in the third wireless transceiver 116. In this example, the second wireless signal path 146 carries data communication between the second wireless transceiver 114 and the third wireless transceiver 116. The receiver in the third wireless transceiver 116 measures the received signal strength of the signal carried along the second wireless signal path 146 and reports that received signal strength along with an identifier of the transmitter of that signal, i.e., the second wireless transceiver 114, to the central monitoring facility.

In various examples, it is to be noted that the receivers in the various wireless transceivers are able to receive and measure the received signal strengths of the wireless signals that are transmitted by each of the nearby wireless transceivers whether or not those wireless signals are not used to communicate with the receiver of the wireless transceiver. In general, receivers in the various wireless transceivers of a particular system are able receive and measure the received signal strengths of any type of wireless signals that are transmitted for any purpose by any nearby wireless transmitter or transceiver and its associated antennas.

The example aerial power line with vegetation growth 100 depicts a first tree 108 that is growing under the first aerial power line portion 128. As shown, the first tree 108 is growing to a point that is near to, but does not yet encroach on, the first aerial power line portion 128. As shown, the top of the first tree 108 is growing into the first wireless signal path 136 that is between the right first antenna 124 and the left second antenna 142. The presence of the top of first tree 108 in the first wireless signal path 136 between those two antennas causes an attenuation of the wireless signal carried in that path and will result in a decrease in received signal strength of that signal as measured by the receiver in the second wireless transceiver 114.

The example aerial power line with vegetation growth 100 also depicts a second tree 110 that is growing under the second aerial power line portion 138. As shown, the second tree 110 has grown to a point that is encroaching on the second aerial power line portion 138. As shown, the portion of the top of the second tree 110 that has grown into the second wireless signal path 146 that is between the right second antenna 144 and the left third antenna 162 is larger than the portion of the first tree 108 that grew into the first wireless signal path 136. The presence of a larger portion of the top of the second tree 110 in the second wireless signal path 146 causes a larger amount of attenuation of the wireless signal received by the third wireless transceiver 116 than was measured by the first wireless transceiver 112 for the signal carried along the first wireless signal path 136. This greater attention results in a larger decrease in received signal strength of the signal carried along the second wireless signal path 146 as measured by the receiver in the third wireless transceiver 116.

The above example describes a difference in signal attenuation caused by two trees that are assumed to have grown by different amounts into paths of wireless signals that are communicated over similar paths. It is clear that this description is analogous to the difference in attenuation of a wireless signal as a particular tree grows and enlarges the bulk of the tree that is in the path of a wireless signal propagating between two wireless transceivers. It is further to be understood that the above description is an example of growing vegetation of any nature encroaching on a power line and similar principles apply to scenarios of having multiple trees growing between transceivers, having any vegetation encroaching on a power line, having any vegetation encroach on any infrastructure that is near a wireless communications path, having any vegetation encroach into any wireless communications path, or combinations of these.

In some examples, radio frequency (RF) signals are used by the wireless transceivers to communicate with one another. The RF receivers in those wireless transceivers measure the received RF signal strength of received RF signals transmitted by other nearby wireless transceivers. In general, higher frequency, shorter wavelength RF signals will experience greater attention when propagating through vegetation. It is therefore observed that incorporating the presently described systems and methods to monitor vegetation growth within a wireless signal path may be applied to process received signal strength of higher frequency radio signals. In some examples, wireless transceivers that operate at very high RF frequencies, such as the millimeter wave frequency ranges about 18 GHz, are being deployed in some instances to support relatively short range communication links from each transceiver. In some examples, so called Fifth Generation (5G) data communications systems are being deployed that use millimeter wave transmission for relatively short range radio links from the transceivers. In order to support wide area communications using 5G data communications systems, a number of transceivers are deployed within an area where the transceivers are close enough to support handing off user devices from one transceiver to another. In an example, such millimeter wave transceivers are mounted on aerial power line support poles in relatively close proximity to other transceivers. Such a deployment of 5G transceivers are an example of a wireless communications systems to which the present systems and methods can be applied to monitor vegetation growth along aerial power lines.

The example aerial power line with vegetation growth 100 show a vegetation trimming truck 170 in the vicinity of the second tree 110. In an example, as is described in further detail below, processing of the received signal strengths of the signal carried along the second wireless signal path 146 as measured and reported by the receiver in the third wireless transceiver 116 identified that it is likely that vegetation is encroaching on power lines between the antennas associated with the second wireless transceiver 114 and the third wireless transceiver 116. Further processing, based on the known locations of the antennas associated with those wireless transceivers, notifies maintenance personnel that vegetation was encroaching on the aerial power lines between the second power line support pole 104 and the third power line support pole 106. Such notifications based on automated monitoring of received signal strengths allowed for proactive dispatch of the vegetation trimming truck 170 prior to the occurrence of power distribution problems or reported outages due to the encroaching second tree 110.

The example aerial power line with vegetation growth 100 further depicts a central monitoring facility 182 and a service dispatch facility 184. The central monitoring facility 182 in an example receives and stores measurements of received signal strengths as are measured and reported by receivers in each wireless transceiver used to support monitoring vegetation growth. The central monitoring facility further includes a database that describes the geographic location of each antenna associated with each wireless transceiver that is used to support monitoring vegetation growth. This data is used by processing, which is described in further detail below, to determine the state of vegetation grown near aerial power lines and to provide notification of likely encroachment by the vegetation onto aerial power lines at particular locations.

In various examples, the processing of signal strength measurement data is able to be performed by various components. In an example, the receiver in each transceiver, such as in the first wireless transceiver 112, the second wireless transceiver 114, the third wireless transceiver 116, or any combinations of these, is able to measure the strength of received signals and send those received signal strength measurements off for further processing, such as to processing resources located within the central monitoring facility 182. In a further example, one or more transceivers, such as in the first wireless transceiver 112, the second wireless transceiver 114, the third wireless transceiver 116, or any combinations of these, are able to include processors that perform some of the initial processing of received signal strength measurements made by that transceiver in order to reduce the amount of data to be communicated to remote facilities and to reduce the amount of processing resources that are needed at remote facilities to process that data. In some of those further examples, a processor in each transceiver processes over time the received signal strength measured by the receiver in that transceiver to determine when the attenuation of the measured signal strength is meeting a threshold. In some examples, control of this processing, parameters to be used by the processing, other aspects of this processing, or combinations of these that occur at the transceiver are able to be provided by a central controller, such as the by processing contained in the central monitoring facility 182. In this example, once it is determined that a threshold is passed, notifications are sent to the central monitoring facility 182 to support taking further action to remedy the detected vegetation encroachment.

The service dispatch facility 184 in an example receives such notifications of likely encroachment by vegetation onto aerial power lines at particular locations. The service dispatch facility 184 in an example is able to dispatch tree trimming trucks, such as the illustrated vegetation trimming truck 170, to the locations indicated in the notifications as being likely to have vegetation encroaching on aerial power lines.

Figure 2:
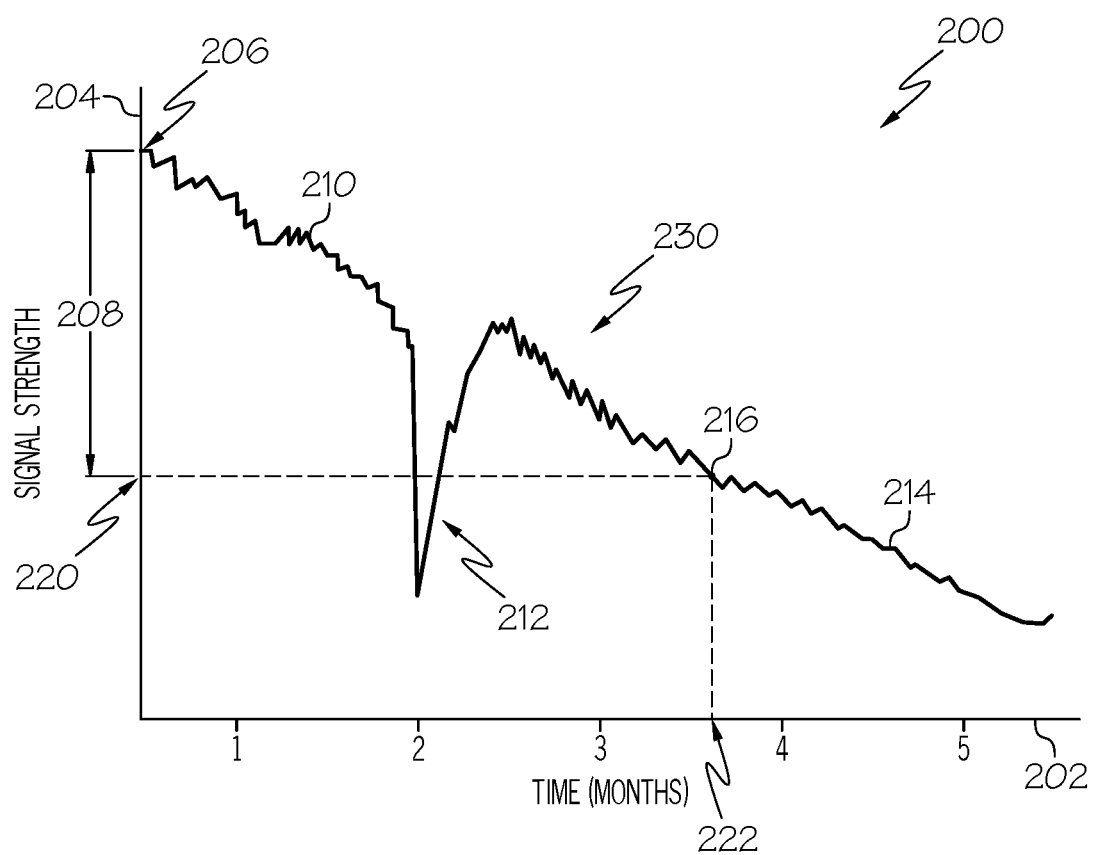
FIG. 2 illustrates a time progression of received signal strength, according to an example.

FIG. 2 illustrates a time progression of received signal strength 200, according to an example. The time progression of received signal strength 200 depicts a time sequence of received signals strength indicators that have been accumulated over a time period of at least five (5) months. In his example, five (5) months is a time period over which the particular type of vegetation being monitored will grow to encroach upon an aerial power line. In general, the rate of growth of different types of vegetation is able to vary greatly and the time period over which the received signal strength of a wireless signal will decrease due to vegetation growth is dependent upon the type of vegetation and its rate of growth. In general, there can be a large variation in the length of time over which measured signal strength is expected to decrease to a level that corresponds to a significant amount of vegetation having grown to block the wireless signal propagation path. In some examples, different types of vegetation may be growing in different areas and the time duration of different time progressions of received signal strengths will vary due to the different types of vegetation that are growing in those areas. In various examples, there is a large variability in the amount of time that such growth takes to occur, and thus the characteristics of a time sequence of measured signal strength that are consistent with vegetation growth are able to vary based on the type or types of vegetation that is growing in the vicinity of the aerial power lines being monitored.

The time progression of received signal strength 200 has a horizontal time axis 202 and a vertical received signal strength axis 204. In an example, the processing identifies a baseline received signal strength 206, which is a signal strength of a received signal from which received signal strength decreases are measured. In an example, the baseline received signal strength 206 is a measured signal strength that is present when no vegetation or not a substantial amount of vegetation is present between the transceiver transmitting the signal and the transceiver receiving the signal. The baseline received signal strength 206 in various examples is able to be determined by any suitable technique. Some examples of identifying or determining a baseline received signal strength 206 are described below.

The time progression of received signal strength 200 includes a depiction of a received measured signal strength time progression 230 that includes an initial time progression, 210, a short term dip 212, and a second time progression 214. The received measured signal strength time progression 230 depicts fairly rapid variations in received signal strength that are attributable to short term phenomenon such as wind blowing of vegetation, birds or other animals interfering with wireless propagation, other short term effects, or combinations of these.

In the illustrated example, processing to determine whether vegetation is likely to encroach on an aerial power line determines whether the measured received signal strength decreases in a relatively slow time progression by more than a threshold value 208 from the baseline received signal strength 206. The magnitude of the threshold is able to be determined by any suitable technique, such as by empirical monitoring of signal levels while physically observing vegetation growth to determine levels of attention that correspond to vegetation encroaching into the aerial power lines.

The received measured signal strength time progression 230 begins with the initial time progression, 210, which starts at the time origin of the time axis 202 and proceeds to the short term dip 212, which occurs about two months after the start of the time axis 202. The initial time progression 210 in this example exhibits a long term average decrease with short term variations. The much more rapid short term variations are caused by transient effects and are not indicative of encroaching vegetation. The presence of encroaching vegetation in the path of a wireless signal path will exhibit a constant, long term decrease in received signal strength due to the attenuation caused by that vegetation.

The short term dip 212 is characterized by a rapid decrease in received signal strength that is followed by a rapid increase in signal strength to about the same level as was observed before the short term dip 212. In various examples, the level that is about the same level as was observed before the short term dip to which the signal strength returns after the short term dip 212 includes a decrease in signal strength that is expected due to vegetation growth during the short term dip 212. Short term dips are able to be caused by various factors, such as repair worker or construction work that encroached into the path of the wireless signal whose received signal strength is being measured.

In some examples, the processing of data contained in a time progression of received signal strength 200 identifies such short term dips and does not indicate likely encroachment of vegetation onto aerial power lines when such short term dips are observed. The illustrated short term dip 212 has a relatively rapid decrease in received signal strength that drops below the growth indication level 220. Because the reduction in received signal strength occurred over a short period of time, the processing excludes the drop below the growth indication threshold value 208. The signal strength reduction indicated in the illustrated short term dip 212 ends and the received signal strength returns to the long term progressive decrease that was observed before the short term dip 212 began.

In some examples, a relatively rapid decrease in received signal strength may occur and that decrease in received signal strength may persist after that drop. An example of such rapid signal decrease that persists is caused by construction of a structure, such as a billboard, that extends into the path of the wireless signal being measured. The processing in some examples is able to respond to a significant short term drop in received signal strength that persists by providing a notification to the operator of the monitoring system so that the cause of the relatively rapid decrease in signal strength can be investigated.

The short term dip 212 is an example of a portion of the set of received signal strength indicators indicates a received signal strength reduction that is faster than is consistent with a progression of a decrease in received signal strength corresponding to vegetation growth. In some examples, upon determination of such a portion, the data points within the short term dip 212 are a portion of the set of received signal strength indicators that is excluded from the set of received signal strength indicators prior to determining that the set of received signal strength indicators is consistent with a progression of a decrease in received signal strength corresponding to a growth of vegetation growing to contact the aerial power line between the first power pole and the second power pole.

After the short term dip 212, the received signal strength exhibits a second time progression 214 that resumes the long term decrease that was observed before the short term dip 212. The illustrated second time progression 214 also exhibits a long term average decrease with short term variations, as is exhibited by the initial time progression 210. The second time progression 214 decreases until it reaches the growth indication level 220 at a notification point 216 a little past the three (3) month period after the baseline received signal strength 206 was established. In an example, an indication is provided that vegetation growth has encroached onto aerial power lines between the receiver and transmitter of the signal being measured based on the value of the received measured signal strength time progression 230 decreasing below the growth indication level 220.

The received measured signal strength time progression 230 is an example of a decreasing time sequence of received signal strength indicators. In some examples, a decreasing time sequence of received signal strength indicators, such as the received measured signal strength time progression 230, is preceded in time by an initial baseline time sequence of received signal strength indicators (not shown). The initial baseline time sequence of received signal strength indicators, in an example, includes an initial time sequence of received signal strength indicators that exhibit consistent signal strength, such as a steady average value that also exhibits rapid short term variations such as those described above with regards to the initial time progression 210. Such rapid short term variations are caused by transient effects and are not indicative of encroaching vegetation. The initial time sequence of received signal strength indicators in an example is processed to determine the baseline received signal strength based on values within the initial baseline time sequence of received signal strength indicators, such as by calculating a long term average of that initial time sequence.

Figure 3:
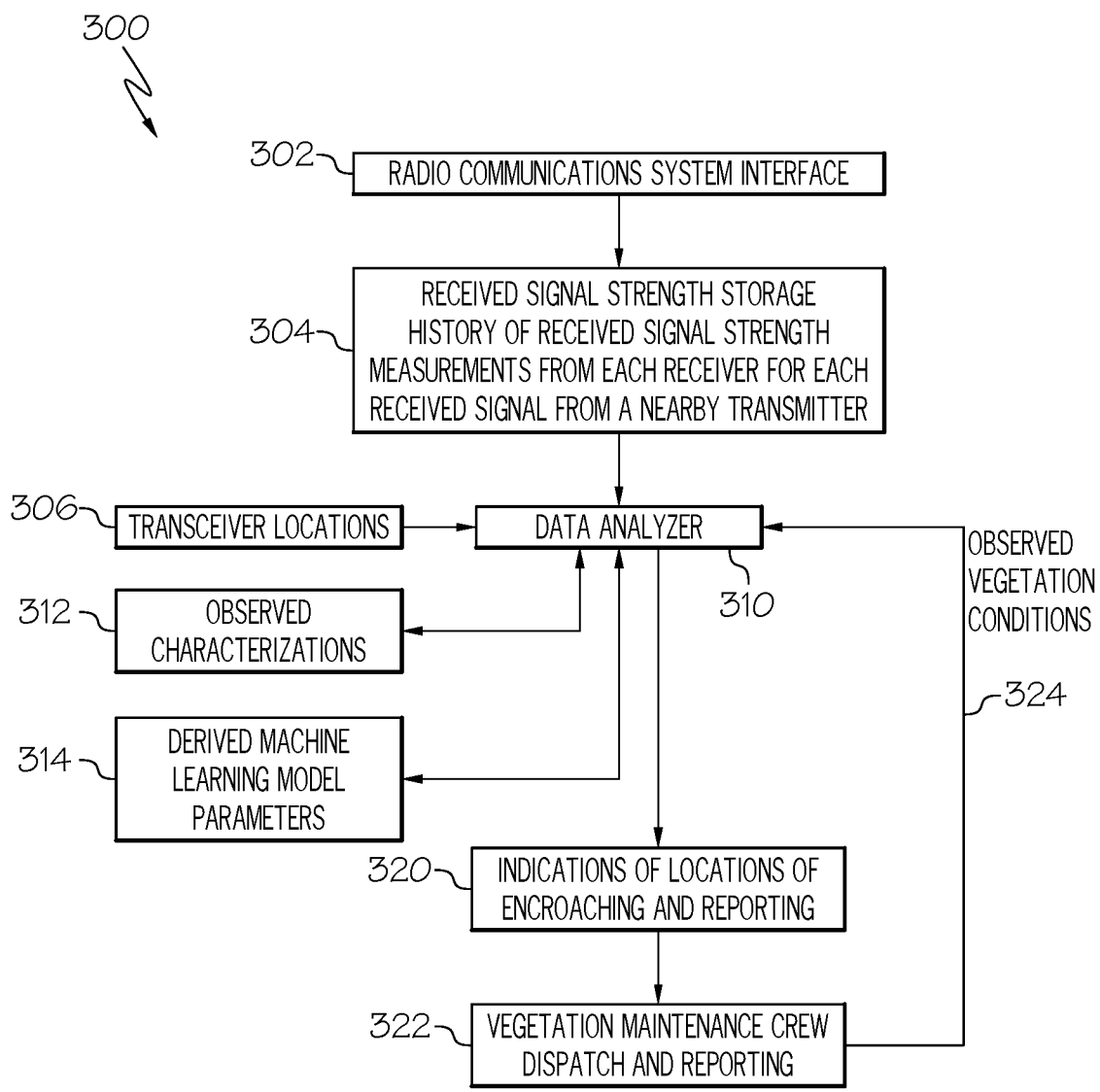
FIG. 3 illustrates a central monitoring facility block diagram, according to an example.

FIG. 3 illustrates a central monitoring facility block diagram 300, according to an example. The central monitoring facility block diagram 300 depicts elements that are included in an example central monitoring facility that performs processing to monitor vegetation growth by receiving and processing received signal strength measurements reported by transceivers near aerial power lines, such as the above discussed central monitoring facility 182. In further examples, facilities used to monitor reported received signal strengths are able to include any suitable architecture, including distributed processing, cloud-based processing, other architectures, or combinations of these. In the present discussion, "received signal strength measurements" refer to measurements of the strength of signals that are sent over wireless signal paths that are being monitored for vegetation encroachment.

The central monitoring facility block diagram 300 includes a radio communication system interface 302. The radio communications system interface 302 in an example communicates in any suitable manner with one or more wireless communications networks that include transceivers, receivers, transmitters, or any combination of these, that are installed on various infrastructure elements, such as power line support poles as are discussed above with regards to the example aerial power line with vegetation growth 100.

The radio communication system interface 302 receives measured received signal strength indicators from various transceivers or the like and provides those indicators to a received signal strength storage 304. In an example, the measured received signal strength indicators received by the radio communications system interface 302 include identifiers of the receiver that made the measurement and also the transmitter from which the received signal was transmitted.

The received signal strength storage 304 in an example receives and stores measured received signal strength indicators in association with other relevant data. In various examples, the measured received signal strength indicators are stored in association with data that is able to include, for example, an identification of the transceiver that made the measurement, the time the measurement was made, the transmitter that transmitted the signal whose received signal strength was measured, other relevant data, or combinations of these.

The central monitoring facility block diagram 300 also includes a transceiver location storage 306. The transceiver location storage 306 in an example stores geographic locations of wireless communications transceivers and their associated antennas. In an example, the transceiver location storage 306 stores the geographic location of each wireless transceiver and its associated antennas in association with an identifier of each transceiver. The transceiver identifiers are used in an example to determine the geographic locations of the transmitting and receiving transmitters that are associated with each measured received signal strength value where identifiers of the transmitting transceiver, the receiving transceiver, or both identifiers, are sent in association with the measured received signal strength values.

In the example discussed above with regards to the example aerial power line with vegetation growth 100, the transceiver location storage 306 stores the geographic locations of the first power line support pole 102 on which the first wireless transceiver 112 and its associated antennas are mounted, the geographic locations of the second power line support pole 104 on which the second wireless transceiver 114 and its associated antennas are mounted, and the geographic locations of the third power line support pole 106 on which the third wireless transceiver 116 and its associated antennas are mounted. In an example, the geographic location of all transceivers used to support monitoring vegetation growth are stored in the transceiver location storage 306.

A data analyzer 310 processes values of measured received signal strength that are stored in the received signal strength storage 304 to identify locations of likely vegetation encroachment. In an example, the data analyzer 310 processes measured received signal strength indicators as provided by each transceiver in order to determine whether a receiver is reporting a time sequence progression of received signal strength that is consistent with a decrease in received signal strength that corresponds to a growth of vegetation growing to contact an aerial power line at a location between the transceiver reporting the measured signal strength and the transceiver that had transmitted that signal. An example of such processing is described in further detail below.

In an example, the data analyzer 310 determines a number of pairs of transceivers where each pair consists of one wireless transceiver receiving a data communications signal and another nearby wireless transceiver receives that signal and measures the received signal's strength. The data analyzer 310 in some examples determines characterizations of time sequences of received signal strength values that are reported by the receiving transceivers in each pair. Examples of such characterizations, such as whether the set of received signal strength indicators is consistent with a progression of a decrease in received signal strength corresponding to a growth, during the received signal strength measurement time duration, of vegetation growing to contact the aerial power line between the first power pole and the second power pole, are described below. Such characterizations in an example are stored in an observed characterizations storage 312.

In some examples, the data analyzer 310 accesses data that defines the geographic locations of aerial power lines that are near wireless transceivers. Based on this data, the data analyzer 310 is able to determine which wireless signal paths between pairs of wireless transceivers runs along aerial power lines. Such information is used in an example to determine which wireless signal paths to monitor for vegetation growth.

In some examples, the data analyzer 310 includes a machine learning algorithm processor that performs processing to process time sequences of measured signal strength values and to identify likely patterns within time sequence progressions of received signal strength indicators for a signal that are likely incidents of vegetation that is encroaching on an aerial powerline at a location that is between the transceiver receiving the signal and the transceiver that transmitted the signal. In some examples, the machine learning algorithm is developed, or trained, using observed vegetation conditions 324 that are reported by various techniques. The data analyzer 310 in some examples develops machine learning based data processing algorithms and stores the parameters of those algorithms into a derived machine learning model parameters storage 314. In some examples, the development, or training, of the machine learning algorithm is an iterative process where the data analyzer 310 uses the machine learning algorithm to produce results, such as indications of likely vegetation encroachment in particular geographic areas, and those results are compared actual observations of vegetation encroachment in the indicated geographic areas to identify errors and refine the machine learning algorithm to improve its accuracy.

The data analyzer 310 in an example produces indications of locations of encroaching vegetation 320. In the illustrated example, the indications of locations of encroaching vegetation 320 is a data storage that contains such indications. These stored indications are able to be used to support prioritizing vegetation trimming operations, performing analysis of the performance, such as the accuracy, of the processing used to determine likely vegetation encroachment, other processing or analyses, or combinations of these.

The central monitoring facility block diagram 300 includes a vegetation maintenance crew dispatch and reporting system 322. In general, the vegetation maintenance crew dispatch and reporting system 322 includes management systems to dispatch maintenance crews to trim vegetation. The vegetation maintenance crew dispatch and reporting system 322 receives and processes the indications of locations of encroaching vegetation 320 and dispatches vegetation trimming crews, such as the above described vegetation trimming truck 170.

In some examples, the vegetation maintenance crew dispatch and reporting system 322 also assembles records of observations of vegetation growth that are reported by various activities such as conventional surveying, customer complaints, other activities, or combinations of these. The vegetation maintenance crew dispatch and reporting system 322 also receives and maintains records of the actual vegetation growth that was present at locations indicated by the indications of location of encroaching vegetation 320 as reported by the crews who are dispatched to those locations. Based on these reported observations, the vegetation maintenance crew dispatch and reporting system 322 produces observed vegetation conditions 324. The observed vegetation conditions 324 in an example are provided by the vegetation maintenance crew dispatch and reporting system 322 as feedback to the data analyzer 310 to support machine learning model development.

Figure 4:
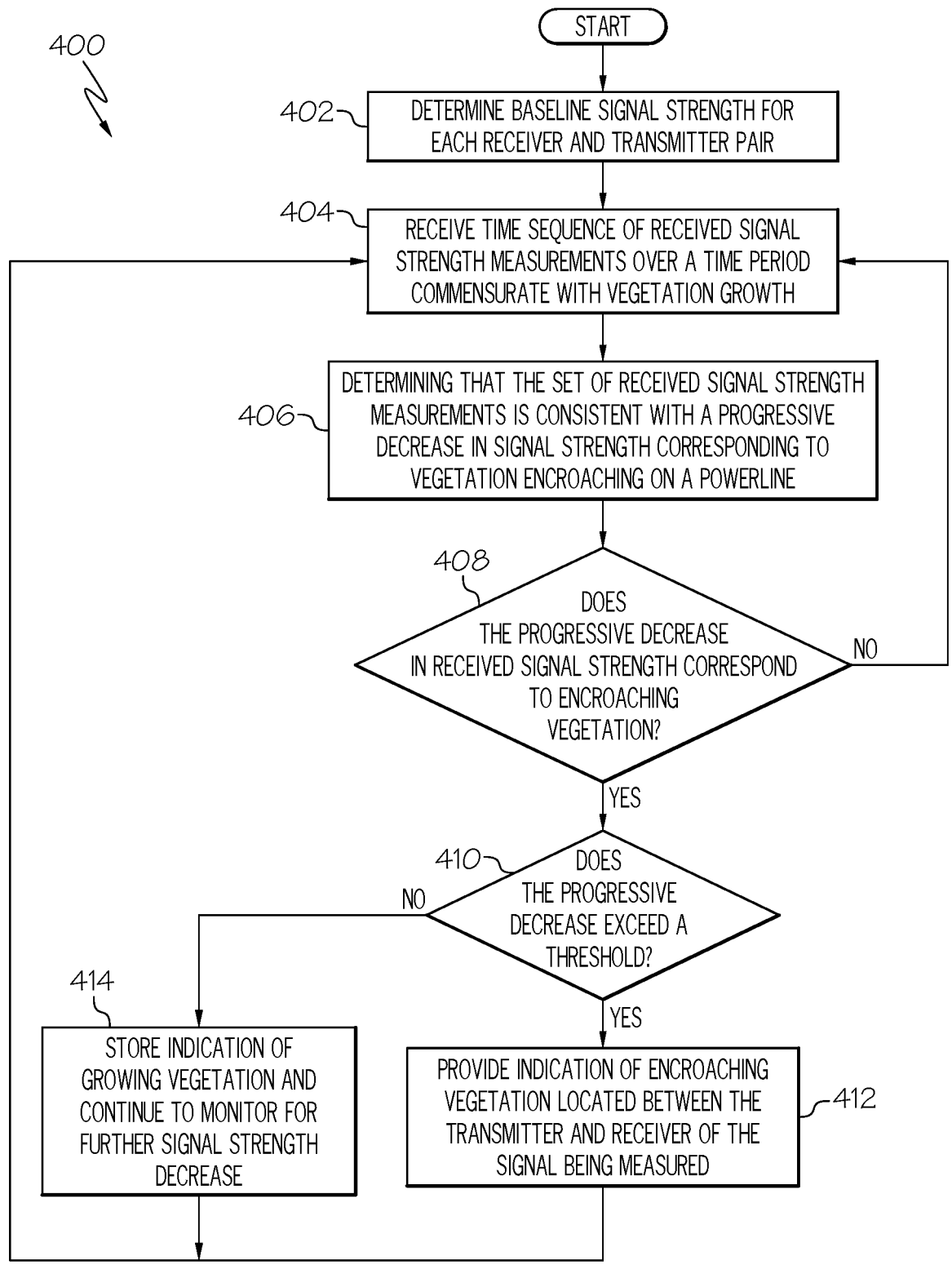
FIG. 4 illustrates a vegetation growth monitoring process, according to an example

FIG. 4 illustrates a vegetation growth monitoring process 400, according to an example. The following description refers to the above described example aerial power line with vegetation growth 100, the time progression of received signal strength 200, and the central monitoring facility block diagram 300. The vegetation growth monitoring process 400 is an example of a process to analyze iterations of the time progression of received signal strength 200. The vegetation growth monitoring process 400 processes a number of time progression of received signal strength 200 that have each been measured over a time duration for a number of wireless signal paths, where each of those wireless signal paths carries a respective wireless communications signal from a respective transmitting wireless transceiver to a respective receiving wireless transceiver. In the following discussion, each wireless signal path for which vegetation growth is being monitored is referred to as being associated with a respective transmitting wireless transceiver and a respective receiving wireless transceiver that are communicating over that wireless signal path.

In some examples, the vegetation growth monitoring process 400 is performed by processors such as the above described data analyzer 310. In an example, the processing is performed at a single location such as in the above described central monitoring facility 182. In further examples, some processing may be distributed across two more processing locations. In an example, some of the initial part of the vegetation growth monitoring process 400 is able to be performed at each transceiver that is performing measurements of the received signal strength, intermediate quantities from that initial processing are able to be sent to processors in other locations, such as the central monitoring facility 182, where the remainder of the vegetation growth monitoring process 400 is performed.

In some examples, the monitoring of a wireless signal path for vegetation encroachment into the path by the vegetation growth monitoring process 400 is an iterative process wherein one or a small set of received signal strength measurements that cover a relatively short time span are captured and processed to determine whether vegetation encroachment is likely to have occurred on aerial power lines present near the observed wireless signal path. In such examples, these one or small set of received signal strength measurements are accumulated over time into the received signal strength storage 304 described above. In some examples, all of the received signal strength measurements that have been accumulated since the baseline signal strength for the wireless signal path has been determined are processed as each new measurement is received in order to identify the observation of a progressive decrease in received signal strength that is commensurate with vegetation encroachment. In further examples, the processing of accumulated received signal strength measurements is able to be performed at any suitable iteration during a time duration over which they are accumulated.

The vegetation growth monitoring process 400 is able to operate on sets of received signal strength indicators that are received from any source. In some examples, sets of received signal strength indicators are received from remote receivers such as by the above described radio communications system interface 302 and those indicators are stored in the received signal strength storage 304. In such an example, the data analyzer 310 receives a set of received signal strength indicators by accessing and retrieving the received signal strength indicators from the received signal strength storage 304. Alternatively, the data analyzer 310 is able to receive and process received signal strength indicators as they are received by the radio communications system interface 302. In another example, part of the vegetation growth monitoring process 400 is performed by a processor that is remote from a central facility, such as in a wireless communications transceiver that is making the received signal strength measurements to be processed. In such an example, that processor receives a set of received signal strength indicators by accessing received signal strength indicators that are stored locally in the transceiver or other remote device, or is able to processes those indicators as the receiver produces them. It is to be understood that the above are only examples and that any one or more processor(s) performing the vegetation growth monitoring process 400 is able to receive sets of received signal strength indicators by any suitable technique.

The vegetation growth monitoring process 400 begins by determining, at 402, a baseline signal strength for each receiver and transmitter pair. In an example, this baseline is established for a particular wireless signal path at the start of monitoring for vegetation growth through that wireless signal path. Starting the monitoring of vegetation growth along a particular wireless signal path in various examples is able to be based on any criteria, such as an input that indicates that vegetation growing within that wireless signal path has recently been cleared.

In some examples, a baseline signal strength for a particular wireless signal path is determined based processing a set of received signal strength indicators that have been measured and reported by a receiver. In an example, a set of received signal strength indicators is processed, where that set includes an initial baseline time sequence of received signal strength indicators and a decreasing time sequence of received signal strength indicators following the initial baseline time sequence of received signal strength indicators. The above described received measured signal strength time progression 230 is an example of a decreasing time sequence of received signal strength indicators. In an example, the initial baseline time sequence includes received signal strength indicators that exhibit consistent signal strength. In one such example, a time sequence of received signal strength indicators that exhibit consistent signal strength refers to a time sequence of signal strength indicators that have a generally constant long term average but that can also exhibit short term variations due to various transient effects.

In some examples, processing of such a set of received signal indicators includes determining the baseline received signal strength. In an example, the baseline received signal strength is determined based on values within the initial baseline time sequence of received signal strength indicators, for example, by determining the long term average within the initial baseline time sequence of received signal strength indicators. The processing in some such examples detects, within the set of received signal strength indicators, a start of the decreasing time sequence of received signal strength indicators. In an example, once the processing detects the start of the decreasing time sequence of received signal strength indicators within the set of received signal strength indicators, the processing responds to that detection by accessing received signal strength indicators that precede the start of the decreasing time sequence to determine the baseline received signal strength, such as by determining a long term average of those received signal strength indicators. In some examples, detection of the start of the decreasing time sequence of received signal strength indicators results in performing further processing of the set of received signal strength indicators, such as processing to determine that the set of received signal strength indicators is consistent with a progression of a decrease in received signal strength corresponding to a growth, during the received signal strength measurement time duration, of vegetation growing to contact the aerial power line between the first power pole and the second power pole.

The vegetation growth monitoring process 400 receives, at 404, a time sequence of received signal strength measurements over a time period commensurate with vegetation growth. The above described received measured signal strength time progression 230 is an example of such a time sequence of received signal strength measurements. As discussed above with regards to the time progression of received signal strength 200, the time duration over which signal strength reductions are measured to determine the encroachment of vegetation into the wireless signal path depends upon the type of vegetation being monitored.

In some examples, as is discussed above, processing within the central monitoring facility block diagram 300 iteratively processes accumulated sets of received signal strength measurement each time one or a small set of received signal strength measurements are received. In some examples, received signal strength measurements may be made each day or once every several days for a particular wireless signal path. The selection of one measurement every day or ever several days is based on the expected rate of growth of the vegetation that may encroach on the wireless signal path. Receipt of each of those measurements in such an example causes performance of the following processing of the vegetation growth monitoring process 400 of all of the accumulated received signal strength measurements for that wireless signal path to determine if vegetation has likely encroached on aerial power lines near that wireless signal path.

The vegetation growth monitoring process 400 determines, at 406, whether the time sequence of received signal strength measurements is consistent with a progression of a decrease in received signal strength corresponding to a growth of vegetation growing to contact an aerial power line near the monitored wireless signal path, such as the aerial power line between the two power poles that are supporting the transceivers communicating over the wireless signal path. Examples of this processing operate to perform this determination are described above with regards to the time progression of received signal strength 200. In some examples, this determination is based in part upon previously determined indications of growing vegetation as were determined by prior iterations of the vegetation growth monitoring process 400 as is described below.

The vegetation growth monitoring process 400 performs a decision, at 408, as to whether the determined progressive decrease in received signal strength corresponds to encroaching vegetation. In an example, this decision includes a determination that the received signal strength is exhibiting a slow, progressive decline. If this decision is negative, the vegetation growth monitoring process 400 returns to receiving, at 404, time sequence of received signal strength measurements and performing the above described processing.

If the decision as to whether the determined progressive decrease in received signal strength corresponds to encroaching vegetation is positive, the vegetation growth monitoring process 400 performs a decision as to whether the decrease in received signal strength exceeds a threshold. In an example, this decision determines whether or not the measured received signal strength is below the growth indication level 220 as is discussed above with regards to the time progression of received signal strength 200. Determining whether or not the measured received signal strength is below the growth indication level 220 is an example of determining that a recent received signal strength indicator in the set of received signal strength indicators has decreased to below a threshold from a baseline received signal strength.

In some examples, processing that includes a machine learning algorithm is included in processing performing the determining, at 406, whether the time sequence of received signal strength measurements is consistent with a progression of a decrease in received signal strength corresponding to a growth of vegetation growing to contact an aerial power line near the monitored wireless signal path, and in some examples also the deciding, at 408, as to whether the determined progressive decrease in received signal strength corresponds to encroaching vegetation. Examples of processing that incorporates machine learning algorithms for this processing are described above with regards to the data analyzer 310.

If the decision as to whether the decrease in received signal strength exceeds a threshold is negative, an indication is stored, at 414, that encroaching vegetation is likely occurring within the monitored wireless signal path and that the processing should continue to monitor for further decreases in received signal strength. In an example, this indication is stored in the observed characterizations storage 312 as is described above with regards to the central monitoring facility block diagram 300.

In some examples, upon deciding that the determined progressive decrease in received signal strength corresponds to encroaching vegetation, at 408, and determining that the progressive decrease does not exceeds the threshold, at 410, as are discussed above, further processing is able to extrapolate, based on determining that the set of received signal strength indicators is consistent with a progression of a decrease in received signal strength corresponding to a growth, during the received signal strength measurement time duration, of vegetation growing to contact the aerial power line between the first power pole and the second power pole, values in the set of received signal strength indicators to determine an extrapolated time at which vegetation is likely to contact the aerial power line. In some of these examples, a further indication of the extrapolated time is able to be provided, such as to a maintenance system.

If the decision as to whether the decrease in received signal strength exceeds a threshold is positive, an indication is provided, at 412, of encroaching vegetation located between the transmitter and receiver of the signal being monitored. In an example, such indications are provided to the indications of locations of encroaching vegetation 320 described above with regards to the central monitoring facility block diagram 300. After proving indications of encroaching vegetation is likely occurring, at 414, or indications of encroaching vegetation, at 412, the vegetation growth monitoring process 400 returns to receiving, at 404, time sequence of received signal strength measurements and performing the above described processing. Providing this indication is an example of providing a notification of likely vegetation encroachment on the aerial power line between the first power pole and the second power pole based on determining that the recent received signal strength indicator is below the threshold and based on determining that the set of received signal strength indicators is consistent with a progression of a decrease in received signal strength corresponding to a growth, during the received signal strength measurement time duration, of vegetation growing to contact the aerial power line between the first power pole and the second power pole.

Figure 5:
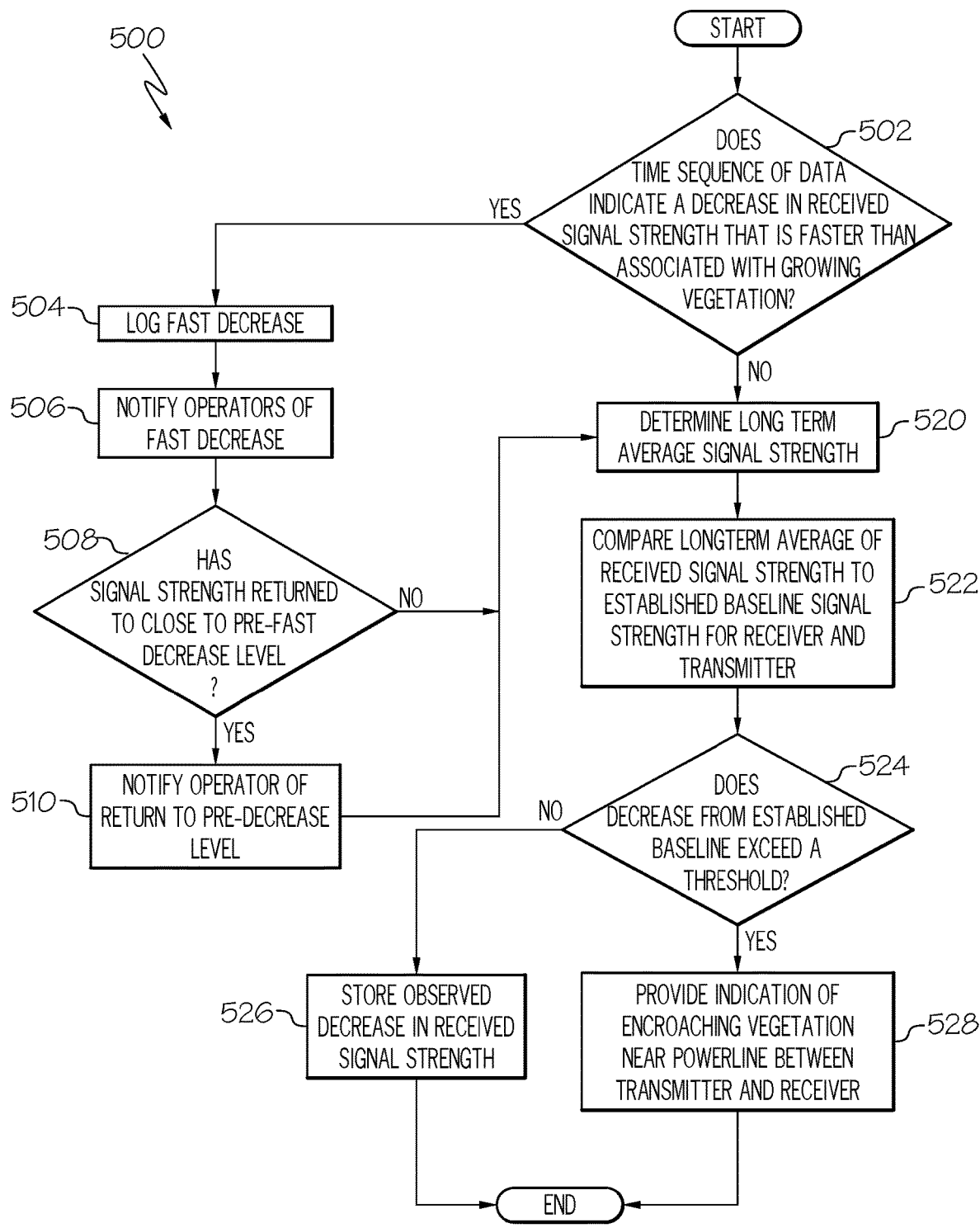
FIG. 5 illustrates a vegetation encroachment determination process, according to an example.

The above example describes determining vegetation encroachment growing to contact the aerial power line between two power poles supporting transceivers that are communicating over a wireless signal path. In further examples, the examples described herein are also able to automatically determine vegetation encroachment into any wireless signal path without regard to its proximity to an aerial power line. In one such example a set of received signal strength indicators comprising at least three received signal strength indicators that are collected over a receiver measurement time duration are received from a receiver that is remote from an aerial power line and in line of sight of the transmitter. A determination is made as to whether that set of received signal strength indicators is consistent with a progression of a decrease in received signal strength corresponding to a growth, during the receiver measurement time duration, of vegetation growing into a wireless signal path between the transmitter and the second receiver;

FIG. 5 illustrates a vegetation encroachment determination process 500, according to an example. The vegetation encroachment determination process 500 is an example of processing performed by the data analyzer 310, discussed above, and is part of the processing discussed above with regards to the vegetation growth monitoring process 400.

In some examples, the vegetation encroachment determination process 500 is performed by processors in the above described central monitoring facility 182. In further examples, as is similarly described above with regards to the vegetation growth monitoring process 400, some processing may be distributed across two more processing locations. In an example, some of the initial part of the vegetation encroachment determination process 500 is able to be performed at each transceiver that is performing measurements of the received signal strength, intermediate quantities from that initial processing are able to be sent to processors in other locations, such as the central monitoring facility 182, where the remainder of the vegetation encroachment determination process 500 is performed.

The vegetation encroachment determination process 500 determines, at 502, if a time sequence of data indicates a decrease in received signal strength that is faster than associated with growing vegetation. An example of such a decrease is depicted in the time progression of received signal strength 200 and discussed above with regards to the decrease exhibited at the start of short term dip 212. Determining if a time sequence of data indicates a decrease in received signal strength that is faster than associated with growing vegetation is an example of determining that a portion of the set of received signal strength indicators indicates a received signal strength reduction that is faster than is consistent with a progression of a decrease in received signal strength corresponding to vegetation growth.

If it is determined that the time sequence of data indicates a decrease in received signal strength that is faster than associated with growing vegetation, the vegetation encroachment determination process 500 logs, at 504, the occurrence of a fast decrease in measured signal strength. In an example the characterization of a fast decrease is stored in the observed characterizations storage 312. In an example, a notification is provided, at 506, of the fast decrease. Such a notification is able to be processed by a data analysis program to assist in determining whether a short term dip 212 is not consistent with vegetation encroachment on an aerial power line, and such a notification is able to be provided to an operator of the system to evaluate whether a physical inspection to be performed to determine the cause of the fast decrease.

In some examples, processing of the set of received signals strength indicators is performed after determining that the time sequence of data indicates a decrease in received signal strength that is faster than associated with growing vegetation, at 502, and determining whether the signal strength in the data being processed has returned to a level that is close to the signal strength levels observed prior to the fast decrease, at 508. In some examples, when a short term dip 212 is detected, the portion of the received signal strength indicators that makes up the short term dip 212 are removed from the set of received signal strength indicators prior to further processing of that set of received signal strength indicators to determine that the set of received signal strength indicators as being a time progression is consistent with a progression of a decrease in received signal strength corresponding to a growth of vegetation as is discussed above with regards to the determination at 406.

The vegetation encroachment determination process 500 then determines, at 508, whether the signal strength in the data being processed has returned to a level that is close to the signal strength levels observed prior to the fast decrease. Such a condition is illustrated at the end of the short term dip 212 discussed above. If it is determined that the signal strength has returned to the level that is close to the signal strength observed prior to the fast decrease, the operator is notified, at 510, that the signal strength has returned to its pre-decrease level. This notification is able to be combined with the earlier described notification of the fast decrease provided at 506.

After providing the notification of a return to pre-decrease level, at 508, or if it is determined that the signal strength has not returned to close to the pre-fast decrease level, at 508, or if it was determined that the time sequence of data does not indicate, at 502, that the time sequence of data indicates a decrease faster than associated with growing vegetation, the vegetation encroachment determination process 500 determined, at 520, a long term average signal strength. Such a long term average signal strength is determined in one example by low-pass filtering the data to remove shorter time period events.

The vegetation encroachment determination process 500 compares, at 522, long term average of received signal strength to the established baseline signal strength for the receiver and transmitter being processed.

A determination is then made, at 524, as to whether the decrease from the established baseline exceeds a threshold. An example of this condition is illustrated in the time progression of received signal strength 200, where it is determined that the notification level 216 of the averaged signal strength falls below the growth indication level 220, which is threshold value 208 less than the established baseline received signal strength 206. If it is determined that the decrease exceeds the threshold, an indication is provided, at 528, of encroaching vegetation near a power line between the transmitter and receiver of the wireless signal path being processed. If it is determined that the decrease does not exceed the threshold, the observed decrease in received signal strength is stored, at 526. The vegetation encroachment determination process 500 then ends.

Figure 6:
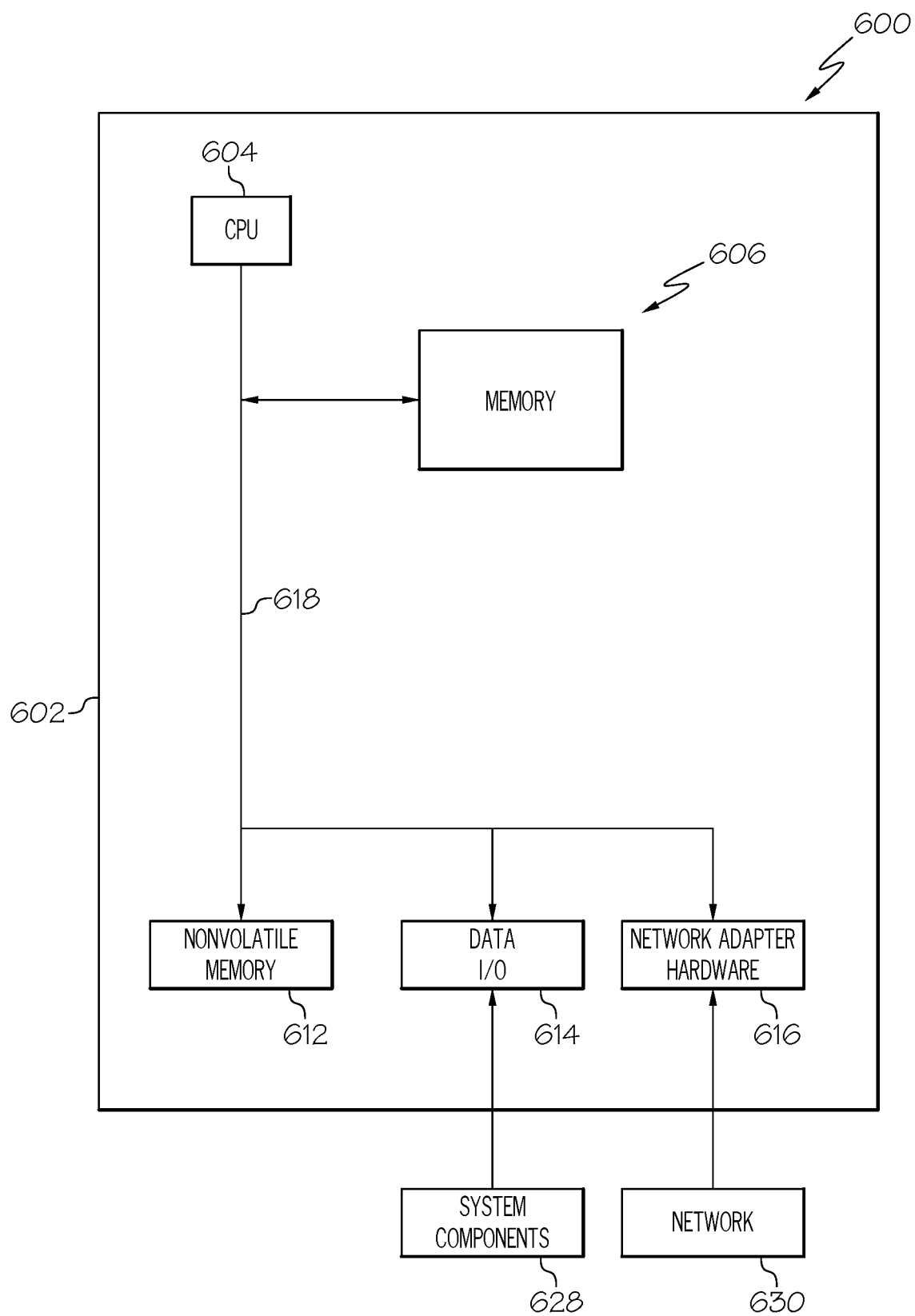
FIG. 6 illustrates a block diagram illustrating a processor, according to an example.

FIG. 6 illustrates a block diagram illustrating a processor 600 according to an example. The processor 600 is an example of a processing subsystem that is able to perform any of the above described processing operations, control operations, other operations, or combinations of these.

The processor 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The processor 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for detecting vegetation growth into a wireless signal path, the method comprising:

receiving, from a receiver mounted at a first location, a set of received signal strength indicators comprising at least three received signal strength indicators each indicating a respective received signal strength measured by the receiver at a different respective time within a received signal strength measurement time duration for a signal that is transmitted from a transmitter mounted at a second location;

determining that the set of received signal strength indicators is consistent with a progression of a decrease in received signal strength corresponding to a growth, during the received signal strength measurement time duration, of vegetation growing into a wireless signal path between the first location and the second location;

determining that a recent received signal strength indicator in the set of received signal strength indicators has decreased to below a threshold from a baseline received signal strength; and providing a notification of likely vegetation encroachment into the wireless signal path between the first location and the second location based on determining that the recent received signal strength indicator is below the threshold and based on determining that the set of received signal strength indicators is consistent with a progression of a decrease in received signal strength corresponding to a growth of vegetation.

2. The method of claim 1, wherein the signal comprises a millimeter wave communications signal.

3. The method of claim 1, further comprising training a machine learning algorithm to perform the determining that the set of received signal strength indicators is consistent with a progression of a decrease in received signal strength corresponding to a growth of vegetation growing into the wireless signal path between the first location and the second location, and wherein determining that the set of received signal strength indicators is consistent with a progression of a decrease in received signal strength corresponding to a growth of vegetation growing into the wireless signal path between the first location and the second location is performed by the machine learning algorithm.

4. The method of claim 1, wherein the set of received signal strength indicators comprises:

an initial baseline time sequence of received signal strength indicators, where the initial baseline time sequence comprises an initial time sequence of received signal strength indicators that exhibit consistent signal strength; and a decreasing time sequence of received signal strength indicators following the initial baseline time sequence of received signal strength indicators, wherein the method further comprises:

determining the baseline received signal strength based on values within the initial baseline time sequence of received signal strength indicators; and detecting, within the set of received signal strength indicators, a start of the decreasing time sequence of received signal strength indicators, and wherein performing the determining that the set of received signal strength indicators is consistent with a progression of a decrease in received signal strength corresponding to a growth of vegetation growing into the wireless signal path between the first location and the second location is based on detecting the start of the decreasing time sequence.

5. The method of claim 1, further comprising:
    determining that a portion of the set of received signal strength indicators indicates a received signal strength reduction that is faster than is consistent with a progression of a decrease in received signal strength corresponding to vegetation growth; and
    excluding, based on determining that a portion of the set of received signal strength indicators indicates a received signal strength reduction that is faster than is consistent with a progression of a decrease in received signal strength corresponding to vegetation growth, the portion from the set of received signal strength indicators prior to determining that the set of received signal strength indicators is consistent with a progression of a decrease in received signal strength corresponding to a growth of vegetation growing into the wireless signal path between the first location and the second location.

6. The method of claim 1,
    wherein the receiver is mounted on a first power pole that is supporting an aerial power line,
    wherein the transmitter is mounted on a second power pole that is also supporting the aerial power line,
    wherein determining that the set of received signal strength indicators is consistent with a progression of a decrease in received signal strength corresponding to a growth, during the received signal strength measurement time duration, of vegetation growing into the wireless signal path between the first location and the second location comprises determining that the set of received signal strength indicators is consistent with a progression of a decrease in received signal strength corresponding to a growth, during the received signal strength measurement time duration, of vegetation growing to contact the aerial power line between the first power pole and the second power pole, and
    wherein the notification comprises a notification of likely vegetation encroachment on the aerial power line between the first power pole and the second power pole.

7. The method of claim 6, further comprising:
    based on determining that the set of received signal strength indicators is consistent with a progression of a decrease in received signal strength corresponding to a growth, during the received signal strength measurement time duration, of vegetation growing to contact the aerial power line between the first power pole and the second power pole, extrapolating values in the set of received signal strength indicators to determine an extrapolated time at which vegetation is likely to contact the aerial power line; and
    providing an indication of the extrapolated time to a maintenance system.

8. A vegetation growth monitoring system, comprising:
    a processor;
    a memory communicatively coupled to the processor;
    a data receiver that, when operating, is configured to receive, from a receiver mounted at a first location, a set of received signal strength indicators comprising at least three received signal strength indicators each indicating a respective received signal strength measured by the receiver at a different respective time within a received signal strength measurement time duration for a signal that is transmitted from a transmitter mounted at a second location; and
    a data analyzer, that when operating, is configured to:
    determine that the set of received signal strength indicators is consistent with a progression of a decrease in received signal strength corresponding to a growth, during the received signal strength measurement time duration, of vegetation growing into a wireless signal path between the first location and the second location;
    determine that a recent received signal strength indicator in the set of received signal strength indicators has decreased to below a threshold from a baseline received signal strength; and
    provide a notification of likely vegetation encroachment into the wireless signal path between the first location and the second location based on a determination that the recent received signal strength indicator is below the threshold and based on a determination that the set of received signal strength indicators is consistent with a progression of a decrease in received signal strength corresponding to a growth of vegetation.

9. The vegetation growth monitoring system of claim 8, wherein the signal comprises a millimeter wave communications signal.

10. The vegetation growth monitoring system of claim 8, wherein the data analyzer further comprises a machine learning algorithm processor that, when operating, is configured to:
    train a machine learning algorithm to perform at least part of processing to determine that the set of received signal strength indicators is consistent with a progression of a decrease in received signal strength corresponding to a growth of vegetation growing into the wireless signal path between the first location and the second location; and
    perform, with the machine learning algorithm based on training the machine learning algorithm, at least part of the processing to determine that the set of received signal strength indicators is consistent with a progression of a decrease in received signal strength corresponding to a growth of vegetation growing into the wireless signal path between the first location and the second location.

11. The vegetation growth monitoring system of claim 8, wherein the set of received signal strength indicators comprises:
    an initial baseline time sequence of received signal strength indicators, where the initial baseline time sequence comprises an initial time sequence of received signal strength indicators that exhibit consistent signal strength; and
    a decreasing time sequence of received signal strength indicators following the initial baseline time sequence of received signal strength indicators,
    wherein the data analyzer, when operating, is further configured to:
        determine the baseline received signal strength based on values within the initial baseline time sequence of received signal strength indicators; and
        detect, within the set of received signal strength indicators, a start of the decreasing time sequence of received signal strength indicators, and
    wherein the data analyzer is configured to determine that the set of received signal strength indicators is consistent with a progression of a decrease in received signal strength corresponding to a growth of vegetation growing into the wireless signal path between the first location and the second location based on detecting the start of the decreasing time sequence.

12. The vegetation growth monitoring system of claim 8, wherein the data analyzer, when operating, is further configured to:

determine that a portion of the set of received signal strength indicators indicates a received signal strength reduction that is faster than is consistent with a progression of a decrease in received signal strength corresponding to vegetation growth; and exclude, based on a determination that a portion of the set of received signal strength indicators indicates a received signal strength reduction that is faster than is consistent with a progression of a decrease in received signal strength corresponding to vegetation growth, the portion from the set of received signal strength indicators prior to determining that the set of received signal strength indicators is consistent with a progression of a decrease in received signal strength corresponding to a growth of vegetation growing into the wireless signal path between the first location and the second location.

13. The vegetation growth monitoring system of claim 8, wherein the receiver is mounted on a first power pole that is supporting an aerial power line, the transmitter is mounted on a second power pole that is also supporting the aerial power line, wherein the data analyzer, when operating, is configured to determine that the set of received signal strength indicators is consistent with a progression of a decrease in received signal strength corresponding to a growth, during the received signal strength measurement time duration, of vegetation growing into the wireless signal path between the first location and the second location by at least determining that the set of received signal strength indicators is consistent with a progression of a decrease in received signal strength corresponding to a growth, during the received signal strength measurement time duration, of vegetation growing to contact the aerial power line between the first power pole and the second power pole, and wherein the notification comprises a notification of likely vegetation encroachment on the aerial power line between the first power pole and the second power pole.

14. The vegetation growth monitoring system of claim 13, where the data analyzer, when operating, is further configure to:

based on a determination that the set of received signal strength indicators is consistent with a progression of a decrease in received signal strength corresponding to a growth of vegetation growing to contact the aerial power line between the first power pole and the second power pole, extrapolate values in the set of received signal strength indicators to determine an extrapolated time at which vegetation is likely to contact the aerial power line; and provide an indication of the extrapolated time to a maintenance system.

15. A computer program product for detecting vegetation growth into a wireless signal path, the computer program product comprising:

a non transitory computer readable storage medium having computer readable program code embodied therewith, the computer readable program code comprising instructions for:

receiving, from a receiver mounted at a first location, a set of received signal strength indicators comprising at least three received signal strength indicators each indicating a respective received signal strength measured by the receiver at a different respective time within a received signal strength measurement time duration for a signal that is transmitted from a transmitter mounted at a second location;

determining that the set of received signal strength indicators is consistent with a progression of a decrease in received signal strength corresponding to a growth, during the received signal strength measurement time duration, of vegetation growing into a wireless signal path between the first location and the second location;

determining that a recent received signal strength indicator in the set of received signal strength indicators has decreased to below a threshold from a baseline received signal strength; and providing a notification of likely vegetation encroachment into the wireless signal path between the first location and the second location based on determining that the recent received signal strength indicator is below the threshold and based on determining that the set of received signal strength indicators is consistent with a progression of a decrease in received signal strength corresponding to a growth of vegetation.

16. The computer program product of claim 15, the computer readable program code further comprising instructions for training a machine learning algorithm to perform the determining that the set of received signal strength indicators is consistent with a progression of a decrease in received signal strength corresponding to a growth of vegetation growing into the wireless signal path between the first location and the second location, and wherein the determination that the set of received signal strength indicators is consistent with a progression of a decrease in received signal strength corresponding to a growth of vegetation growing into the wireless signal path between the first location and the second location is performed by the machine learning algorithm.

17. The computer program product of claim 15, wherein the set of received signal strength indicators comprises:

an initial baseline time sequence of received signal strength indicators, where the initial baseline time sequence comprises an initial time sequence of received signal strength indicators that exhibit consistent signal strength; and a decreasing time sequence of received signal strength indicators following the initial baseline time sequence of received signal strength indicators, wherein the computer readable program code further comprising instructions for:

determining the baseline received signal strength based on values within the initial baseline time sequence of received signal strength indicators; and detecting, within the set of received signal strength indicators, a start of the decreasing time sequence of received signal strength indicators, and wherein the instructions for performing the determining that the set of received signal strength indicators is consistent with a progression of a decrease in received signal strength corresponding to a growth of vegetation growing into the wireless signal path between the first location and the second location are based on detecting the start of the decreasing time sequence.

18. The computer program product of claim 15, the computer readable program code further comprising instructions for:

determining that a portion of the set of received signal strength indicators indicates a received signal strength reduction that is faster than is consistent with a progression of a decrease in received signal strength corresponding to vegetation growth; and excluding, based on determining that a portion of the set of received signal strength indicators indicates a received signal strength reduction that is faster than is consistent with a progression of a decrease in received signal strength corresponding to vegetation growth, the portion from the set of received signal strength indicators prior to determining that the set of received signal strength indicators is consistent with a progression of a decrease in received signal strength corresponding to a growth of vegetation growing into the wireless signal path between the first location and the second location.

19. The computer program product of claim 15,
wherein the receiver is mounted on a first power pole that is supporting an aerial power line,
wherein the transmitter is mounted on a second power pole that is also supporting the aerial power line,
wherein the computer readable program code for determining that the set of received signal strength indicators is consistent with a progression of a decrease in received signal strength corresponding to a growth, during the received signal strength measurement time duration, of vegetation growing into the wireless signal path between the first location and the second location comprises instructions for:
  determining that the set of received signal strength indicators is consistent with a progression of a decrease in received signal strength corresponding to a growth of vegetation during the received signal strength measurement time duration, of vegetation growing to contact the aerial power line between the first power pole and the second power pole, and
wherein the notification comprises a notification of likely vegetation encroachment on the aerial power line between the first power pole and the second power pole.

20. The computer program product of claim 19, the computer readable program code further comprising instructions for:
  based on determining that the set of received signal strength indicators is consistent with a progression of a decrease in received signal strength corresponding to a growth, during the received signal strength measurement time duration, of vegetation growing to contact the aerial power line between the first power pole and the second power pole, extrapolating values in the set of received signal strength indicators to determine an extrapolated time at which vegetation is likely to contact the aerial power line; and
  providing an indication of the extrapolated time to a maintenance system.

* * * * *